(12) United States Patent
Nair et al.

(10) Patent No.: US 12,724,479 B2
(45) Date of Patent: Sep. 1, 2026

(54) PRESENTING NOTIFICATIONS IN A SYSTEM WITH ELECTRONIC DEVICES

(71) Applicant: Apple Inc., Cupertino, CA (US)

(72) Inventors: Rahul Nair, Hayward, CA (US); Paulo R Jansen dos Reis, San Jose, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 18/646,065

(22) Filed: Apr. 25, 2024

(65) Prior Publication Data

US 2024/0370083 A1 Nov. 7, 2024

Related U.S. Application Data

(60) Provisional application No. 63/500,218, filed on May 4, 2023.

(51) Int. Cl.
*G06F 3/01* (2006.01)
*G06F 3/14* (2006.01)

(52) U.S. Cl.
CPC .............. *G06F 3/013* (2013.01); *G06F 3/012* (2013.01); *G06F 3/1423* (2013.01)

(58) Field of Classification Search
CPC ......... G06F 3/013; G06F 3/012; G06F 3/1423
See application file for complete search history.

(56) References Cited

U.S. PATENT DOCUMENTS 8,292,433 B2 10/2012 Vertegaal
9,569,426 B1 2/2017 Bostick et al.
10,375,223 B2 * 8/2019 Duarte .................. G06F 3/0481
10,386,888 B2 8/2019 Berardinelli
12,282,595 B2 * 4/2025 Agrawal ................... G06T 7/70
2004/0183749 A1 * 9/2004 Vertegaal .................. G06F 3/14 345/7
2009/0322695 A1 * 12/2009 Cho .................... G06F 3/04845 345/173
2013/0147686 A1 * 6/2013 Clavin ................. G02B 27/017 345/8
2016/0109946 A1 * 4/2016 George-Svahn .... G06F 3/04842 345/156
2016/0192322 A1 * 6/2016 Eramian ................. H04W 4/12 455/466
2018/0255013 A1 * 9/2018 Dunne .................. H04L 51/224
2024/0329732 A1 * 10/2024 Agrawal ............... G06F 3/1423

* cited by examiner

*Primary Examiner* — Mihir K Rayan
(74) *Attorney, Agent, or Firm* — Treyz Law Group, P.C.; Joseph F. Guihan

(57) ABSTRACT

A head-mounted device may be used with an external electronic device. One or more sensors on the head-mounted device may obtain sensor data that is used to determine whether the external electronic device is actively being viewed. When the external electronic device is actively being viewed, a notification may be presented on a display of the external electronic device. When the external electronic device is not actively being viewed, a notification may be presented on a display of the head-mounted device. An electronic device may determine whether a display in the electronic device is being viewed by one or more viewers. When the display is being viewed by more than one viewer, the electronic device may send an instruction to a head-mounted device to cause the head-mounted device to present a notification.

24 Claims, 7 Drawing Sheets

PRESENTING NOTIFICATIONS IN A SYSTEM WITH ELECTRONIC DEVICES

This application claims the benefit of U.S. provisional patent application No. 63/500,218 filed May 4, 2023, which is hereby incorporated by reference herein in its entirety.

BACKGROUND

This relates generally to electronic devices, and, more particularly, to electronic devices with output devices.

Some electronic devices use output devices such as displays to present notifications. However, a user may not see a notification if the notification is presented on the display of an electronic device that is not actively being viewed.

SUMMARY

An electronic device may include one or more sensors, one or more output devices, one or more processors, and memory storing instructions configured to be executed by the one or more processors, the instructions for obtaining, using the one or more sensors, sensor data, using the sensor data, determining whether an external electronic device is being actively viewed, and in accordance with determining that the external electronic device is not being actively viewed, presenting a notification using the one or more output devices.

An electronic device may include one or more sensors, one or more output devices, communication circuitry configured to communicate with first and second external electronic devices, one or more processors, and memory storing instructions configured to be executed by the one or more processors, the instructions for obtaining, using the one or more sensors, sensor data, using the sensor data, determining whether the first external electronic device is being actively viewed, and in accordance with determining that the first external electronic device is not being actively viewed, sending, using the communication circuitry, an instruction to the second external electronic device to cause the second external electronic device to present a notification.

An electronic device comprising one or more sensors, one or more displays, communication circuitry configured to communicate with an external electronic device, one or more processors, and memory storing instructions configured to be executed by the one or more processors, the instructions for obtaining, using the one or more sensors, sensor data, using at least the sensor data, determining whether the one or more displays is being viewed by multiple viewers, and in accordance with determining that the one or more displays is being viewed by multiple viewers, sending, using the communication circuitry, an instruction to the external electronic device to cause the external electronic device to present a notification.

DETAILED DESCRIPTION

Figure 1:
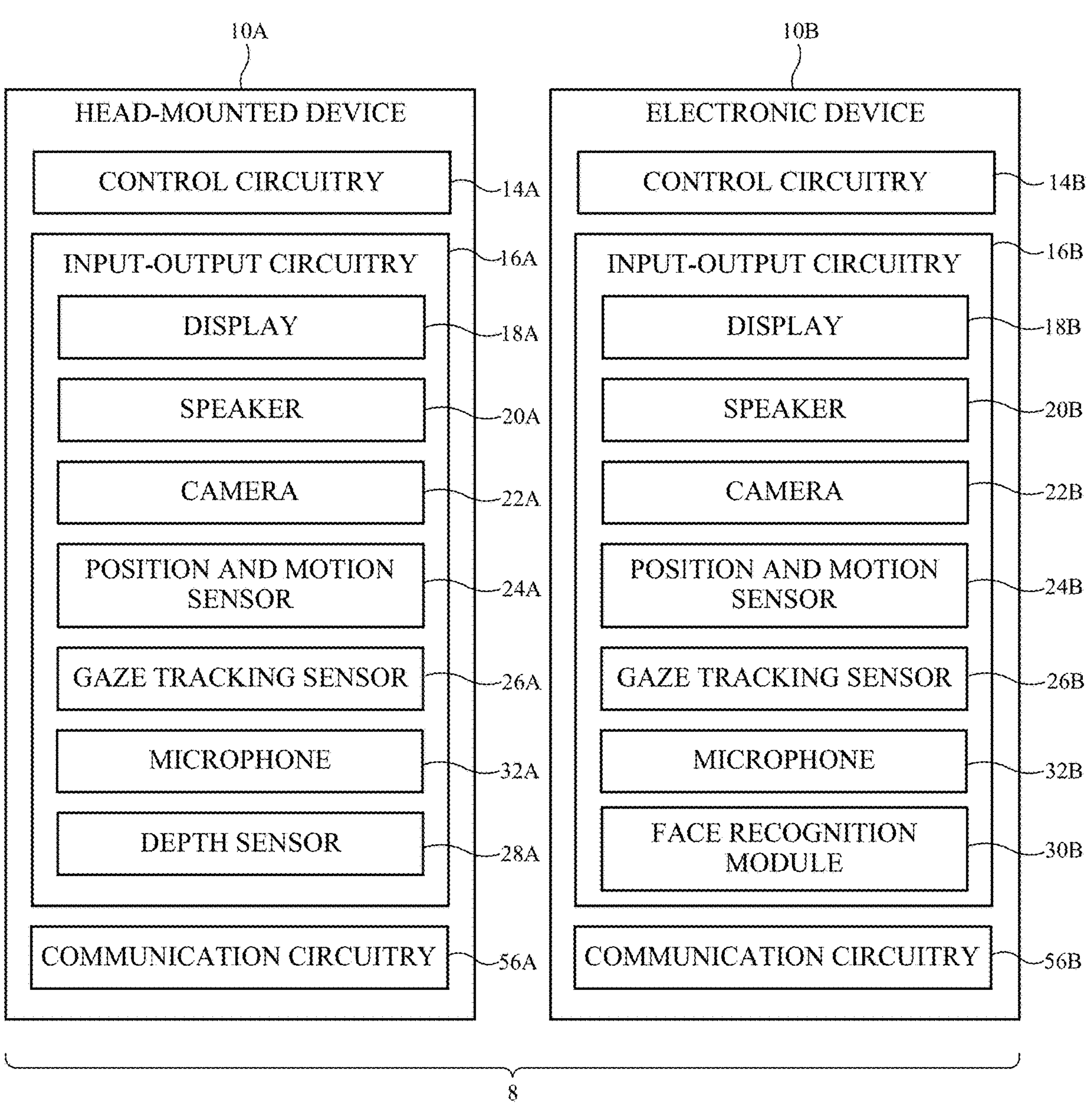
FIG. 1 is a schematic diagram of an illustrative system including a head-mounted device and an electronic device in accordance with some embodiments.

Head-mounted devices may display different types of extended reality content for a user. The head-mounted device may display a virtual object that is perceived at an apparent depth within the physical environment of the user. Virtual objects may sometimes be displayed at fixed locations relative to the physical environment of the user. For example, consider an example where a user's physical environment includes a table. A virtual object may be displayed for the user such that the virtual object appears to be resting on the table. As the user moves their head and otherwise interacts with the XR environment, the virtual object remains at the same, fixed position on the table (e.g., as if the virtual object were another physical object in the XR environment). This type of content may be referred to as world-locked content (because the position of the virtual object is fixed relative to the physical environment of the user).

Other virtual objects may be displayed at locations that are defined relative to the head-mounted device or a user of the head-mounted device. First, consider the example of virtual objects that are displayed at locations that are defined relative to the head-mounted device. As the head-mounted device moves (e.g., with the rotation of the user's head), the virtual object remains in a fixed position relative to the head-mounted device. For example, the virtual object may be displayed in the front and center of the head-mounted device (e.g., in the center of the device's or user's field-of-view) at a particular distance. As the user moves their head left and right, their view of their physical environment changes accordingly. However, the virtual object may remain fixed in the center of the device's or user's field of view at the particular distance as the user moves their head (assuming gaze direction remains constant). This type of content may be referred to as head-locked content. The head-locked content is fixed in a given position relative to the head-mounted device (and therefore the user's head which is supporting the head-mounted device). The head-locked content may not be adjusted based on a user's gaze direction. In other words, if the user's head position remains constant and their gaze is directed away from the head-locked content, the head-locked content will remain in the same apparent position.

Second, consider the example of virtual objects that are displayed at locations that are defined relative to a portion of the user of the head-mounted device (e.g., relative to the user's torso). This type of content may be referred to as body-locked content. For example, a virtual object may be displayed in front and to the left of a user's body (e.g., at a location defined by a distance and an angular offset from a forward-facing direction of the user's torso), regardless of which direction the user's head is facing. If the user's body is facing a first direction, the virtual object will be displayed in front and to the left of the user's body. While facing the first direction, the virtual object may remain at the same, fixed position relative to the user's body in the XR environment despite the user rotating their head left and right (to look towards and away from the virtual object). However, the virtual object may move within the device's or user's field of view in response to the user rotating their head. If the user turns around and their body faces a second direction that is the opposite of the first direction, the virtual object will be repositioned within the XR environment such that it is still displayed in front and to the left of the user's body. While facing the second direction, the virtual object may remain at the same, fixed position relative to the user's body in the XR environment despite the user rotating their head left and right (to look towards and away from the virtual object).

In the aforementioned example, body-locked content is displayed at a fixed position/orientation relative to the user's body even as the user's body rotates. For example, the virtual object may be displayed at a fixed distance in front of the user's body. If the user is facing north, the virtual object is in front of the user's body (to the north) by the fixed distance. If the user rotates and is facing south, the virtual object is in front of the user's body (to the south) by the fixed distance.

Alternatively, the distance offset between the body-locked content and the user may be fixed relative to the user whereas the orientation of the body-locked content may remain fixed relative to the physical environment. For example, the virtual object may be displayed in front of the user's body at a fixed distance from the user as the user faces north. If the user rotates and is facing south, the virtual object remains to the north of the user's body at the fixed distance from the user's body.

Body-locked content may also be configured to always remain gravity or horizon aligned, such that head and/or body changes in the roll orientation would not cause the body-locked content to move within the XR environment. Translational movement may cause the body-locked content to be repositioned within the XR environment to maintain the fixed distance from the user. Subsequent descriptions of body-locked content may include both of the aforementioned types of body-locked content.

A schematic diagram of an illustrative system having a head-mounted device and an electronic device is shown in FIG. 1. As shown in FIG. 1, system 8 may include one or more electronic devices such as electronic device 10A and electronic device 10B. The electronic devices of system 8 may include computers such as laptop computers, cellular telephones, head-mounted devices, wristwatch devices, tablet computers, earbuds, a display with a wired connection to a computer, and other electronic devices. Configurations in which electronic device 10A is a head-mounted device and electronic device 10B is a laptop computer are described herein as an example.

As shown in FIG. 1, electronic device 10A (sometimes referred to as head-mounted device 10A, system 10A, head-mounted display 10A, etc.) may have control circuitry 14A. In addition to being a head-mounted device, electronic device 10A may be other types of electronic devices such as a cellular telephone, laptop computer, speaker, computer monitor, electronic watch, tablet computer, etc.

Control circuitry 14A may be configured to perform operations in head-mounted device 10A using hardware (e.g., dedicated hardware or circuitry), firmware and/or software. Software code for performing operations in head-mounted device 10A and other data is stored on non-transitory computer readable storage media (e.g., tangible computer readable storage media) in control circuitry 14A. The software code may sometimes be referred to as software, data, program instructions, instructions, or code. The non-transitory computer readable storage media (sometimes referred to generally as memory) may include non-volatile memory such as non-volatile random-access memory (NVRAM), one or more hard drives (e.g., magnetic drives or solid-state drives), one or more removable flash drives or other removable media, or the like. Software stored on the non-transitory computer readable storage media may be executed on the processing circuitry of control circuitry 14A. The processing circuitry may include application-specific integrated circuits with processing circuitry, one or more microprocessors, digital signal processors, graphics processing units, a central processing unit (CPU) or other processing circuitry.

Head-mounted device 10A may include input-output circuitry 16A. Input-output circuitry 16A may be used to allow a user to provide head-mounted device 10A with user input. Input-output circuitry 16A may also be used to gather information on the environment in which head-mounted device 10A is operating. Output components in circuitry 16A may allow head-mounted device 10A to provide a user with output.

As shown in FIG. 1, input-output circuitry 16A may include a display such as display 18A. Display 18A may be used to display images for a user of head-mounted device 10A. Display 18A may be a transparent or translucent display so that a user may observe physical objects through the display while computer-generated content is overlaid on top of the physical objects by presenting computer-generated images on the display. A transparent or translucent display may be formed from a transparent or translucent pixel array (e.g., a transparent organic light-emitting diode display panel) or may be formed by a display device that provides images to a user through a transparent structure such as a beam splitter, holographic coupler, or other optical coupler (e.g., a display device such as a liquid crystal on silicon display). Alternatively, display 18A may be an opaque display that blocks light from physical objects when a user operates head-mounted device 10A. In this type of arrangement, a pass-through camera may be used to display physical objects to the user. The pass-through camera may capture images of the physical environment and the physical environment images may be displayed on the display for viewing by the user. Additional computer-generated content (e.g., text, game-content, other visual content, etc.) may optionally be overlaid over the physical environment images to provide an extended reality environment for the user. When display 18A is opaque, the display may also optionally display entirely computer-generated content (e.g., without displaying images of the physical environment).

Display 18A may include one or more optical systems (e.g., lenses) (sometimes referred to as optical assemblies) that allow a viewer to view images on display(s) 18A. A single display 18A may produce images for both eyes or a pair of displays 18A may be used to display images. In configurations with multiple displays (e.g., left and right eye displays), the focal length and positions of the lenses may be selected so that any gap present between the displays will not be visible to a user (e.g., so that the images of the left and right displays overlap or merge seamlessly). Display modules (sometimes referred to as display assemblies) that generate different images for the left and right eyes of the user may be referred to as stereoscopic displays. The stereoscopic displays may be capable of presenting two-dimensional content (e.g., a user notification with text) and three-dimensional content (e.g., a simulation of a physical object such as a cube).

Display 18A may include an organic light-emitting diode display or other displays based on arrays of light-emitting diodes, a liquid crystal display, a liquid-crystal-on-silicon display, a projector or display based on projecting light beams on a surface directly or indirectly through specialized optics (e.g., digital micromirror devices), an electrophoretic display, a plasma display, an electrowetting display, or any other desired display.

Input-output circuitry 16A may include various other input-output devices. For example, input-output circuitry 16A may include one or more speakers 20A that are configured to play audio and/or one or more microphones 32A that are configured to capture audio data from the user and/or from the physical environment around the user.

Input-output circuitry 16A may include one or more cameras 22A. Cameras 22A may include one or more outward-facing cameras (that face the physical environment around the user when the electronic device is mounted on the user's head, as one example). Cameras 22A may capture visible light images, infrared images, or images of any other desired type. The cameras may be stereo cameras if desired. Outward-facing cameras may capture pass-through video for device 10. Cameras 22A may also include inward-facing cameras (e.g., for gaze detection).

As shown in FIG. 1, input-output circuitry 16A may include position and motion sensors 24A (e.g., compasses, gyroscopes, accelerometers, and/or other devices for monitoring the location, orientation, and movement of electronic device 10, satellite navigation system circuitry such as Global Positioning System circuitry for monitoring user location, etc.). Using sensors 24A, for example, control circuitry 14A can monitor the current direction in which a user's head is oriented relative to the surrounding environment (e.g., a user's head pose). The cameras in cameras 22A may also be considered part of position and motion sensors 24A. The cameras may be used for face tracking (e.g., by capturing images of the user's jaw, mouth, etc. while the device is worn on the head of the user), body tracking (e.g., by capturing images of the user's torso, arms, hands, legs, etc. while the device is worn on the head of user), and/or for localization (e.g., using visual odometry, visual inertial odometry, or other simultaneous localization and mapping (SLAM) technique).

Input-output circuitry 16A may include a gaze-tracking sensor 26A (sometimes referred to as gaze-tracker 26A, gaze-tracking system 26A, gaze detection sensor 26A, etc.). The gaze-tracking sensor 26A may include a camera and/or other gaze-tracking sensor components (e.g., light sources that emit beams of light so that reflections of the beams from a user's eyes may be detected) to monitor the user's eyes. Gaze-tracker 26A may face a user's eyes and may track a user's gaze. A camera in the gaze-tracking system may determine the location of a user's eyes (e.g., the centers of the user's pupils), may determine the direction in which the user's eyes are oriented (the direction of the user's gaze), may determine the user's pupil size (e.g., so that light modulation and/or other optical parameters and/or the amount of gradualness with which one or more of these parameters is spatially adjusted and/or the area in which one or more of these optical parameters is adjusted based on the pupil size), may be used in monitoring the current focus of the lenses in the user's eyes (e.g., whether the user is focusing in the near field or far field, which may be used to assess whether a user is day dreaming or is thinking strategically or tactically), and/or other gaze information. Cameras in the gaze-tracking system may sometimes be referred to as inward-facing cameras, gaze-detection cameras, eye-tracking cameras, gaze-tracking cameras, or eye-monitoring cameras. If desired, other types of image sensors (e.g., infrared and/or visible light-emitting diodes and light detectors, etc.) may also be used in monitoring a user's gaze. The use of a gaze-detection camera in gaze-tracker 26A is merely illustrative.

Input-output circuitry 16 may include one or more depth sensors 28A. Each depth sensor may be a pixelated depth sensor (e.g., that is configured to measure multiple depths across the physical environment) or a point sensor (that is configured to measure a single depth in the physical environment). Each depth sensor (whether a pixelated depth sensor or a point sensor) may use phase detection (e.g., phase detection autofocus pixel(s)) or light detection and ranging (LIDAR) to measure depth. Camera images (e.g., from one of cameras 22) may also be used for monocular and/or stereo depth estimation. Any combination of depth sensors may be used to determine the depth of physical objects in the physical environment.

Input-output circuitry 16A may also include other sensors and input-output components if desired (e.g., ambient light sensors, force sensors, temperature sensors, touch sensors, buttons, capacitive proximity sensors, light-based proximity sensors, other proximity sensors, strain gauges, gas sensors, pressure sensors, moisture sensors, magnetic sensors, audio components, haptic output devices such as actuators and/or vibration motors, light-emitting diodes, other light sources, etc.).

Head-mounted device 10A may also include communication circuitry 56A to allow the head-mounted device to communicate with external equipment (e.g., a tethered computer, a portable device such as electronic device 10B, one or more external servers, or other electrical equipment). Communication circuitry 56A may be used for both wired and wireless communication with external equipment.

Communication circuitry 56A may include radio-frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

The radio-frequency transceiver circuitry in wireless communications circuitry 56A may handle wireless local area network (WLAN) communications bands such as the 2.4 GHZ and 5 GHz Wi-Fi® (IEEE 802.11) bands, wireless personal area network (WPAN) communications bands such as the 2.4 GHz Bluetooth® communications band, cellular telephone communications bands such as a cellular low band (LB) (e.g., 600 to 960 MHz), a cellular low-midband (LMB) (e.g., 1400 to 1550 MHZ), a cellular midband (MB) (e.g., from 1700 to 2200 MHZ), a cellular high band (HB) (e.g., from 2300 to 2700 MHZ), a cellular ultra-high band (UHB) (e.g., from 3300 to 5000 MHz, or other cellular communications bands between about 600 MHz and about 5000 MHz (e.g., 3G bands, 4G LTE bands, 5G New Radio Frequency Range 1 (FR1) bands below 10 GHz, etc.), a near-field communications (NFC) band (e.g., at 13.56 MHZ), satellite navigations bands (e.g., an L1 global positioning system (GPS) band at 1575 MHz, an L5 GPS band at 1176 MHz, a Global Navigation Satellite System (GLONASS) band, a BeiDou Navigation Satellite System (BDS) band, etc.), ultra-wideband (UWB) communications band(s) supported by the IEEE 802.15.4 protocol and/or other UWB communications protocols (e.g., a first UWB communications band at 6.5 GHz and/or a second UWB communications band at 8.0 GHz), and/or any other desired communications bands.

The radio-frequency transceiver circuitry may include millimeter/centimeter wave transceiver circuitry that supports communications at frequencies between about 10 GHz and 300 GHz. For example, the millimeter/centimeter wave transceiver circuitry may support communications in Extremely High Frequency (EHF) or millimeter wave communications bands between about 30 GHz and 300 GHz and/or in centimeter wave communications bands between about 10 GHz and 30 GHz (sometimes referred to as Super High Frequency (SHF) bands). As examples, the millimeter/centimeter wave transceiver circuitry may support communications in an IEEE K communications band between about 18 GHz and 27 GHZ, a $K_a$ communications band between about 26.5 GHZ and 40 GHz, a $K_u$ communications band between about 12 GHZ and 18 GHz, a V communications band between about 40 GHz and 75 GHz, a W communications band between about 75 GHz and 110 GHz, or any other desired frequency band between approximately 10 GHz and 300 GHz. If desired, the millimeter/centimeter wave transceiver circuitry may support IEEE 802.11ad communications at 60 GHz (e.g., WiGig or 60 GHz Wi-Fi bands around 57-61 GHZ), and/or $5^{th}$ generation mobile networks or $5^{th}$ generation wireless systems (5G) New Radio (NR) Frequency Range 2 (FR2) communications bands between about 24 GHz and 90 GHz.

Antennas in wireless communications circuitry 56A may include antennas with resonating elements that are formed from loop antenna structures, patch antenna structures, inverted-F antenna structures, slot antenna structures, planar inverted-F antenna structures, helical antenna structures, dipole antenna structures, monopole antenna structures, hybrids of these designs, etc. Different types of antennas may be used for different bands and combinations of bands. For example, one type of antenna may be used in forming a local wireless link and another type of antenna may be used in forming a remote wireless link antenna.

Electronic device 10B may be communicatively coupled with electronic device 10A. In other words, a wireless link may be established directly or indirectly between electronic devices 10A and 10B to allow communication between devices 10A and 10B. Electronic devices 10A and 10B may be associated with the same user (e.g., signed into a cloud service using the same user ID), may exchange wireless communications, etc. As previously described, electronic device 10A may be a head-mounted device whereas electronic device 10B may be an electronic device such as a cellular telephone, watch, laptop computer, earbuds, etc.

Electronic device 10B may include control circuitry 14B, input-output circuitry 16B, display 18B, speaker 20B, camera 22B, position and motion sensors 24B, gaze tracking sensor 26B, microphone 32B, face recognition module 30B, and communication circuitry 56B. Control circuitry 14B, input-output circuitry 16B, display 18B, speaker 20B, camera 22B, position and motion sensors 24B, gaze tracking sensor 26B, microphone 32B, and communication circuitry 56B may have the same features and capabilities as the corresponding components in electronic device 10A and, for simplicity, the descriptions thereof will not be repeated. It is noted that display 18B may include an organic light-emitting diode display or other displays based on arrays of light-emitting diodes, a liquid crystal display, a liquid-crystal-on-silicon display, a projector or display based on projecting light beams on a surface directly or indirectly through specialized optics (e.g., digital micromirror devices), an electrophoretic display, a plasma display, an electrowetting display, or any other desired display.

Face recognition module 30B may include a flood illuminator, a speckle illuminator, and an image sensor. The image sensor (sometimes referred to as an inward-facing image sensor) may be positioned to capture images in front of electronic device 10B. For example, the image sensor may be positioned to capture images of the user (e.g., the user's face) while the user views display 18B and operates electronic device 10B. The inward-facing image sensor may be, for example, an array of sensors. Sensors in the sensor array may include, but not be limited to, charge coupled device (CCD) and/or complementary metal oxide semiconductor (CMOS) sensor elements to capture infrared images (IR) or other non-visible electromagnetic radiation. The image sensor may detect light at an infrared wavelength such as a wavelength in the range of 800-1100 nanometers (e.g., 940 nanometers). In some embodiments, the face recognition module may include more than one image sensor to capture multiple types of images (e.g., both an infrared image sensor and a visible light sensor that senses red, blue, and green light may be included).

The flood illuminator may include an infrared light source (e.g., a laser, lamp, infrared light-emitting diode, an array of vertical-cavity surface-emitting lasers (VCSELs), etc.). The flood illuminator may provide constant and/or pulsed illumination at an infrared wavelength such as a wavelength in the range of 800-1100 nanometers (e.g., 940 nanometers). For example, the flood illuminator may provide flood infrared (IR) illumination to flood a subject with IR illumination (e.g., an IR flashlight). The flood infrared illumination comprises diffused infrared light that uniformly covers a given area. The inward-facing image sensor may capture images of the flood IR illuminated subject. The captured images may be, for example, two-dimensional images of the subject illuminated by IR light.

The speckle illuminator may include an infrared light source (e.g., a laser, lamp, infrared light-emitting diode, an array of vertical-cavity surface-emitting lasers (VCSELs), etc.). The speckle illuminator may provide constant and/or pulsed illumination at an infrared wavelength such as a wavelength in the range of 800-1100 nanometers (e.g., 940 nanometers). For depth detection or generating a depth map image, the speckle illuminator may provide IR illumination with a speckle pattern. The speckle pattern (sometimes referred to as structured light) may be a pattern of collimated light spots (e.g., a pattern of dots) with a known, and controllable, configuration and pattern projected onto a subject. The speckle illuminator may include a vertical-cavity surface-emitting laser (VCSEL) array configured to form the speckle pattern or a light source and patterned layer configured to form the speckle pattern. The configuration and pattern of the speckle pattern provided by the speckle illuminator may be selected, for example, based on a desired speckle pattern density (e.g., dot density) at the subject. The inward-facing image sensor may capture images of the subject illuminated by the speckle pattern. The captured image of the speckle pattern on the subject may be assessed (e.g., analyzed and/or processed) by an imaging and processing system (ISP) to produce or estimate a three-dimensional map of the subject (e.g., a depth map or depth map image of the subject).

The components of face recognition module 30B may be used to confirm whether or not a user is an authorized user of the electronic device. For example, control circuitry 14B within the electronic device may unlock the electronic device if face recognition module 30B confirms the person viewing the electronic device is an authorized user for the electronic device. Control circuitry 14B within the electronic device may not unlock the electronic device if face recognition module 30B determines that the person viewing the electronic device is not an authorized user for the electronic device.

In the event that electronic device 10B is a cellular telephone or tablet computer, electronic device 10B may have a housing and display 18B may form a front face of the electronic device within the housing. In the event that electronic device 10B is a watch, electronic device 10B may have a housing, display 18B may form a front face of the electronic device within the housing, and a wristwatch strap may extend from first and second opposing sides of the housing. In the event that electronic device 10B is a laptop computer, electronic device 10B may have a lower housing with a keyboard and/or touchpad and an upper housing with a display. The lower housing and the upper housing may be coupled at a hinge such that the upper housing rotates relative to the lower housing to open and close the laptop computer.

Figure 2A:
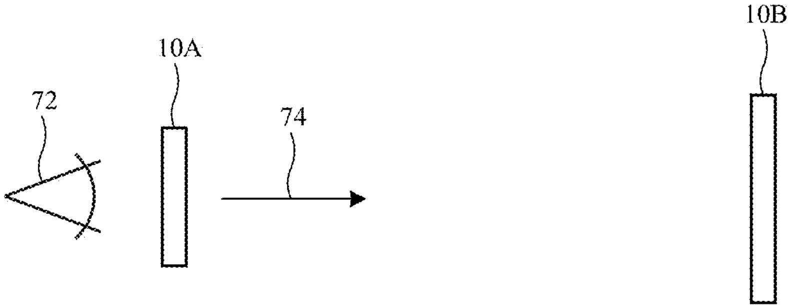
FIG. 2A is a view of a three-dimensional environment including an electronic device that is being directly viewed by a user with a head-mounted device in accordance with some embodiments.

FIG. 2A is a view of a three-dimensional environment including a head-mounted device 10A and a communicatively coupled electronic device 10B. Head-mounted device 10A may be worn by a user 72. Electronic device 10B and head-mounted device 10A both belong to user 72 (e.g., are signed into a cloud service using a common user ID). During operation of head-mounted device 10A and/or electronic device 10B, it may be desirable to present a notification to user 72. The notification may be prompted by an incoming text message, an incoming phone call, an incoming email, etc.

If desired, the notification may be presented on both head-mounted device 10A and electronic device 10B. However, simultaneously presenting the notification using both devices may not be the preferred user experience for some systems. To avoid simultaneously presenting the notification multiple times, the notification instead may only be presented using one of the electronic devices.

The user may set a default device to present notifications and/or may set a hierarchy of devices to present notifications. In general, any of the configurations for presenting notifications herein may be configured by the user in their device settings. As an example, the user may select electronic device 10B as the first choice to present notifications, followed by head-mounted device 10A.

Figure 2B:
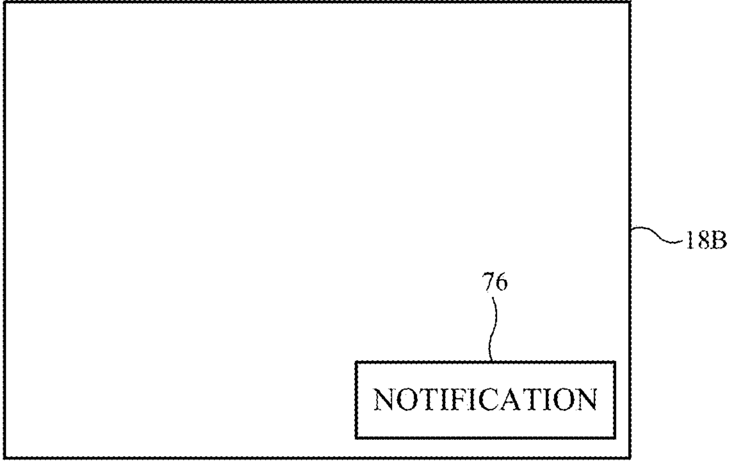
FIG. 2B is a view of a display of the electronic device of FIG. 2A presenting a notification in accordance with some embodiments.

Presenting notifications on electronic device 10B may be a satisfactory way to present notifications to user 72 if user 72 is actively viewing electronic device 10B. In the example of FIG. 2A, user 72 is looking in direction 74 at electronic device 10B. In other words, electronic device 10B is being actively viewed by user 72 through head-mounted device 10A. The user therefore sees notification 76 on display 18B, as reflected in the view of display 18B in FIG. 2B. As shown in FIG. 2B, the notification may be presented in a corner of the display (e.g., the lower-right corner in FIG. 2B) or any other desired location within display 18B.

Because user 72 is actively viewing display 18B in FIG. 2A, the user immediately sees notification 76 on display 18B when the notification is presented. However, in some cases the user may not be actively viewing display 18B of electronic device 10B at a time when a notification is presented (or intended to be presented).

Figure 3A:
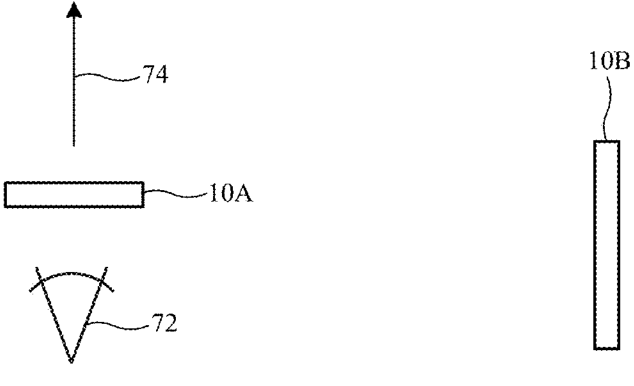
FIG. 3A is a view of a three-dimensional environment including an electronic device that is not being directly viewed by a user with a head-mounted device in accordance with some embodiments.

FIG. 3A is a view of a three-dimensional environment including a head-mounted device 10A and a communicatively coupled electronic device 10B that is not being actively viewed. As shown in FIG. 3A, user 72 is looking in direction 74 away from electronic device 10B. Electronic device 10B is therefore not being actively viewed by user 72.

Figure 3B:
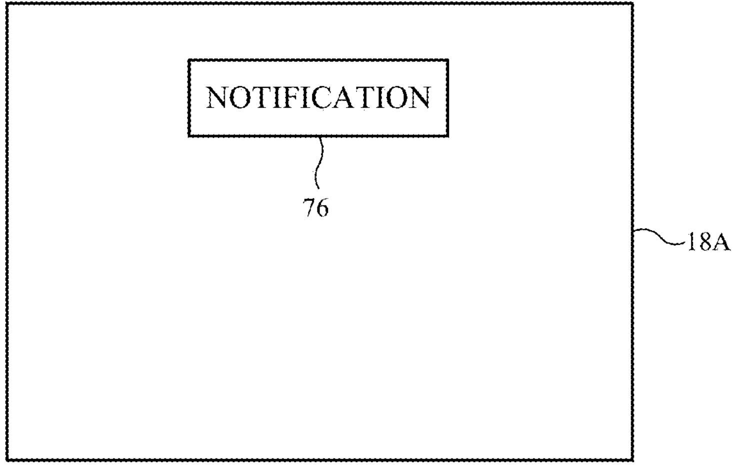
FIG. 3B is a view of a display of the head-mounted device of FIG. 3A presenting a notification in accordance with some embodiments.

When electronic device 10B is not being actively viewed, a notification on display 18B will not be seen by the user. Therefore, as shown in FIG. 3B, head-mounted device 10A may instead present notification 76 on display 18A when electronic device 10B is not being actively viewed. Even if electronic device 10B is preferred (e.g., higher in the selected hierarchy) for presenting notifications, head-mounted device 10A usurps electronic device 10B for presenting the notification when electronic device 10B is not being viewed.

FIG. 3B shows an example where notification 76 is centered on the display. This example is merely illustrative and notification 76 may be presented at any desired location within the display. The notification 76 may be presented as head-locked content, world-locked content, or body-locked content by display 18A. The notification 76 may be presented at any desired perceived depth.

Information (e.g., sensor data) from head-mounted device 10A and/or electronic device 10B may be used to determine whether or not electronic device 10B is actively being viewed. Head-mounted device 10A includes one or more cameras and/or one or more gaze detection sensors that may be able to determine when electronic device 10B is being actively viewed, as examples.

A notification that is only presented on electronic device 10B when electronic device 10B is actively being viewed may be referred to as an attention-based notification. In other words, system 8 aims to present a notification on a single device and aims for the notification to be immediately noticed by the user. Therefore, the system determines which device is being paid attention to and factors this into the decision for which device presents the notification.

The example of presenting the notification using head-mounted device 10A when electronic device 10B is not being actively viewed is merely illustrative. In another possible arrangement, shown in FIGS. 4A and 4B, the notification may be presented on an additional electronic device 10C when electronic device 10B is not being actively viewed.

Figure 4A:
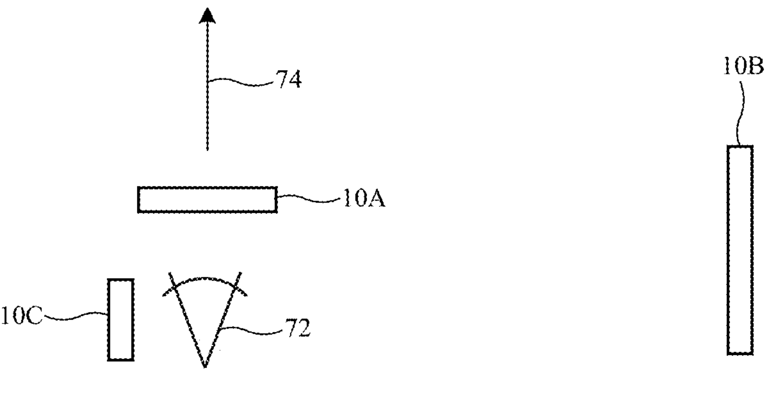
FIG. 4A is a view of a three-dimensional environment including an electronic device that is not being directly viewed by a user with a head-mounted device and an additional electronic device in accordance with some embodiments.
Figure 4B:
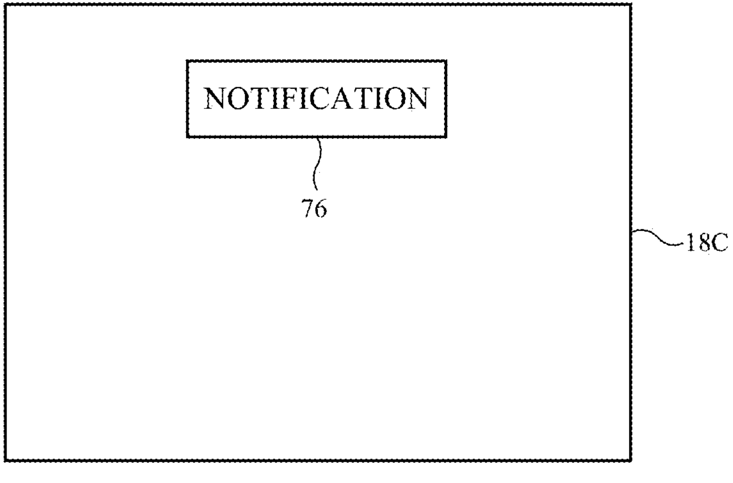
FIG. 4B is a view of a display of the additional electronic device of FIG. 4A presenting a notification in accordance with some embodiments.

FIG. 4A shows a three-dimensional environment including a head-mounted device 10A, a first communicatively coupled electronic device 10B that is not being actively viewed, and a second communicatively coupled electronic device 10C. As shown in FIG. 4A, user 72 is looking in direction 74 away from electronic device 10B. In this scenario, the notification 76 may instead be presented on display 18C of electronic device 10C, as shown in FIG. 4B.

In general, electronic device 10C may have any of the properties of electronic devices 10A and 10B. Electronic device 10C may be a head-mounted device, cellular telephone, laptop computer, watch, tablet computer, earbuds, etc.

Consider a scenario where electronic device 10B is a laptop computer and electronic device 10C is a cellular telephone. There may be an established hierarchy (e.g., a default hierarchy, a hierarchy selected by the user, etc.) that laptop computer 10B is preferred to present notifications, followed by cellular telephone 10C, followed by head-mounted device 10A. In FIG. 2A, laptop computer 10B is actively viewed by the user and therefore an incoming notification is presented on display 18B of laptop computer 10B. In FIGS. 3A and 4A, laptop computer 10B is not actively viewed by the user. It is therefore preferrable to present the notification using another electronic device where the notification will be noticed more quickly by user 72. As previously mentioned, cellular telephone 10C may be preferred to head-mounted device 10A for presenting the notification. Therefore, in FIG. 4A when cellular telephone 10C is present the notification is presented using the cellular telephone. In FIG. 3A when cellular telephone 10C is not present the notification is presented using the head-mounted device 10A.

This example of a device hierarchy for presenting notifications is merely illustrative. In general, any desired hierarchy may be used among the devices in system 8. As an example hierarchy, devices with larger displays may be preferred to present notifications. Some devices may be configured to only present notifications when they are being actively viewed. Some devices may be configured to present notifications regardless of whether they are being actively viewed.

A laptop computer may be the first option to present a notification but may only present the notification if actively being viewed. A cellular telephone may be the second option to present a notification but may only present the notification if actively being viewed. A watch may be the third option to present a notification and may present the notification regardless of whether the watch is actively being viewed. In this example, the laptop computer has a larger display than the cellular telephone and the cellular telephone has a larger display than the watch.

A laptop computer may be the first option to present a notification but may only present the notification if actively being viewed. A cellular telephone may be the second option to present a notification but may only present the notification if actively being viewed. A head-mounted device may be the third option to present a notification. If the laptop computer and cellular telephone are not being viewed, then the head-mounted device presents the notification.

In some situations, it may be desirable for only one user to view a notification on electronic device 10B. In other words, it may be desirable for notification presented on an electronic device to be private to only the user of that electronic device. In the three-dimensional environment of FIG. 5, a first user 72-1 and a second user 72-2 are both viewing electronic device 10B. The first user 72-1 may be wearing a head-mounted device 10A and may have an additional communicatively coupled electronic device 10C. Electronic devices 10A, 10B, and 10C may all be communicatively coupled (e.g., may be paired or signed into a cloud service using a common user ID associated with user 72-1).

Figure 5:
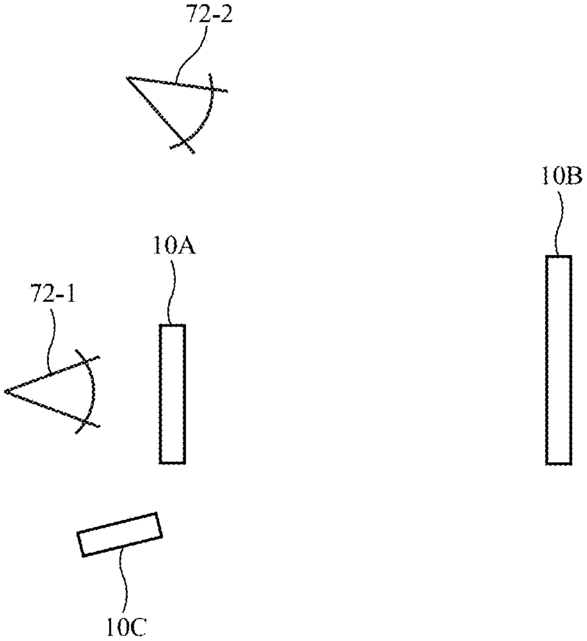
FIG. 5 is a view of a three-dimensional environment including an electronic device that is being directly viewed by multiple viewers including a user with a head-mounted device in accordance with some embodiments.

In FIG. 5, user 72-1 may receive a notification that needs to be presented. Devices 10A, 10B, and 10C therefore determine one of the devices to present the notification. Electronic device 10B may be the preferred electronic device to present the notification. However, it may be desirable for the notification to be visible to only user 72-1. Accordingly, one or more sensors in electronic devices 10A, 10B, and 10C may be used to determine if there are multiple active viewers of electronic device 10B. If there is only one active viewer of electronic device 10B (e.g., user 72-1), electronic device 10B may present the notification (as in FIG. 2B). However, if there are multiple active viewers of electronic device 10B (e.g., users 72-1 and 72-2 as in FIG. 5), then the notification may instead be presented using head-mounted device 10A (as in FIG. 3B) or additional electronic device 10C (as in FIG. 4B).

Figure 6:
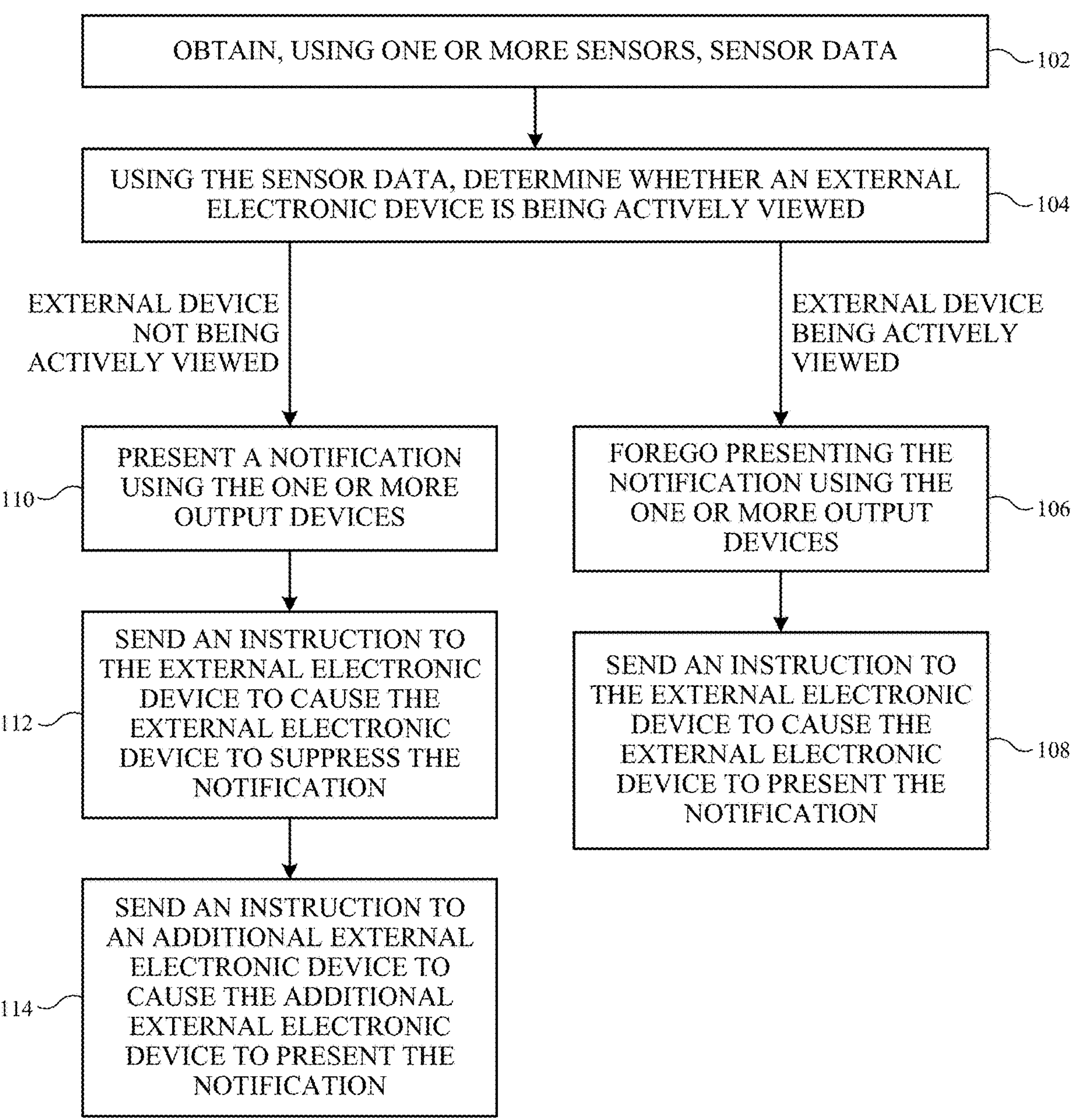
FIG. 6 is a flowchart showing an illustrative method for operating a head-mounted device that determines upon which device to present a notification in accordance with some embodiments.

FIG. 6 is a flowchart of illustrative method blocks performed by an electronic device with one or more sensors such as head-mounted device 10A. At block 102, the electronic device may obtain sensor data using one or more sensors. The one or more sensors may include camera 22A, position and motion sensor 24A, gaze tracking sensor 26A, microphone 32A, depth sensor 28A, and/or any other desired sensors. Ultra-wideband (UWB) communications between devices 10A and 10B may also be used to determine the position of electronic device 10B relative to head-mounted device 10A.

Other information may be gathered at block 102 such as whether an external electronic device is unlocked, input received at an input component such as a touch-sensitive display or keyboard, etc.

Obtaining the sensor data in block 102 may be performed in response to receiving an incoming notification (e.g., an incoming email, text message, or phone call). In other words, one or more of the sensors that gather data at block 102 may be turned on (or may have a sampling rate increased) at block 102 in accordance with an intention to present a notification to the user.

During block 102 and/or block 104, head-mounted device 10A may determine whether any external electronic devices such as electronic device 10B are communicatively coupled to head-mounted device 10A (e.g., in response to an intention to present a notification). If there are no devices communicatively coupled to head-mounted device 10A, a notification may automatically be presented using head-mounted device 10A. However, if there is a communicatively coupled device, head-mounted device may determine a desired device to present the notification.

At block 104, the head-mounted device may determine, using the sensor data from block 102, whether an external electronic device is actively being viewed. The external electronic device may be a communicatively coupled electronic device such as electronic device 10B. Because the external electronic device 10B is communicatively coupled with head-mounted device 10A, head-mounted device 10A may know that electronic device 10B is powered on and in the vicinity of head-mounted device 10A. However, it is also desirable to determine whether or not electronic device 10B is being actively viewed by the user of head-mounted device 10A.

Camera 22A may capture images within the field-of-view of head-mounted device 10A (which is assumed to include the field-of-view of the user of head-mounted device 10A). The images from camera 22A may be analyzed to detect whether electronic device 10B is present. If electronic device 10B is present in images from camera 22A, it is an indicator that electronic device 10B is being viewed by the user of head-mounted device 10A.

Position and motion sensors 24A may determine a user's head position relative to electronic device 10B. If position and motion sensors 24A determine that a user's head position (sometimes referred to as head pose) is aligned with (e.g., facing) electronic device 10B, it is an indicator that electronic device 10B is being viewed by the user of head-mounted device 10A.

Gaze tracking sensor 26A may determine a user's direction of gaze and/or point of gaze. Accordingly, the gaze tracking sensor 26A may be used to determine if the user's direction of gaze and/or point of gaze is aligned with electronic device 10B. If the user's point of gaze is aligned with electronic device 10B, it is an indicator that electronic device 10B is being viewed by the user of head-mounted device 10A.

Depth sensor 28A may obtain depth information for the physical environment around head-mounted device 10A. The depth information (e.g., a depth map) may be used to identify whether or not electronic device 10B is present and the position of electronic device 10B relative to head-mounted device 10A. If the depth information indicates that electronic device 10B is present in front of head-mounted device 10A and/or within a typical viewing distance of head-mounted device 10A, it is an indicator that electronic device 10B is being viewed by the user of head-mounted device 10A.

If desired, head-mounted device 10A may use information from one or more additional electronic devices to determine if electronic device 10B is actively being viewed by the user. For example, head-mounted device 10A may receive sensor data from electronic device 10B (e.g., images captured by camera 22B, pose information from position and motion sensors 24B, information from face recognition module 30B, etc.) using communication circuitry 56A. The information may be received wirelessly (e.g., using Bluetooth communications). The information received from electronic device 10B may be used by head-mounted device 10A to determine whether electronic device 10B is being viewed by the user of head-mounted device 10A. As another example, head-mounted device 10A may receive sensor data from additional electronic device 10C using communication circuitry 56A. The information received from electronic device 10C may be used by head-mounted device 10A to determine whether electronic device 10B is being viewed by the user of head-mounted device 10A.

Any or all of the aforementioned factors may be used by control circuitry 14A to determine whether electronic device 10B is being actively viewed at block 104.

If, at block 104, head-mounted device 10A determines that the external electronic device 10B is actively being viewed, the head-mounted device may perform one or more of blocks 106 and 108. If, at block 104, head-mounted device 10A determines that the external electronic device 10B is not actively being viewed, the head-mounted device may perform one or more of blocks 110, 112, and 114.

In response to determining that external electronic device 10B is actively being viewed, head-mounted device 10A may forego presenting the notification using input-output circuitry 16A at block 106. Instead or in addition, in response to determining that external electronic device 10B is actively being viewed, head-mounted device 10A may send an instruction to external electronic device 10B to cause the external electronic device to present the notification at block 108. In other words, head-mounted device 10A causes the notification to be presented on only electronic device 10B. The instruction at block 108 may be wirelessly transmitted using communication circuitry 56A or transmitted using a wired connection (if available).

In response to determining that external electronic device 10B is not actively being viewed, head-mounted device 10A may present the notification using one or more output devices at block 110. For example, a visual notification may be displayed on display 18A or an audio notification may be played using speaker 20A.

At block 112, in response to determining that external electronic device 10B is not actively being viewed, the head-mounted device 10A may send an instruction to external electronic device 10B to cause external electronic device 10B to suppress the notification. The instruction at block 112 may be wirelessly transmitted using communication circuitry 56A or transmitted using a wired connection (if available).

In some arrangements, when external electronic device 10B is communicatively coupled with head-mounted device 10A, external electronic device 10B may only present notifications after receiving a specific instruction from head-mounted device 10A to do so (e.g., the instruction of block 108). In this case, block 112 may be omitted as the absence of an instruction to present the notification is sufficient to cause the notification to not be presented using electronic device 10B.

At block 114, in response to determining that external electronic device 10B is not actively being viewed, head-mounted device 10A may send an instruction to an additional external electronic device to cause the additional external electronic device to present the notification. The instruction at block 114 may be wirelessly transmitted using communication circuitry 56A or transmitted using a wired connection (if available). The additional external electronic device (e.g., electronic device 10C) may be a device that is lower on a hierarchy of target devices for presenting notifications than the external electronic device 10B.

One or more blocks in FIG. 6 may be omitted if desired. For example, the head-mounted device may perform any one, two, or three blocks out of blocks 110, 112, and 114 in response to determining that external electronic device 10B is not actively being viewed (with the other blocks being omitted). In some cases, a notification may be presented using more than one but less than all of the communicatively coupled devices in the system (e.g., the notification may be presented by devices 10A and 10C when device 10B is not actively being viewed).

In one example, the external electronic device is a laptop computer that is communicatively coupled with the head-mounted device. Head-mounted device 10A may obtain sensor data at block 102 and determine at block 104 whether the laptop computer 10B is actively being viewed. In response to determining that the laptop computer 10B is not actively being viewed, head-mounted device 10A proceeds to present a notification using display 18A at block 110 and send an instruction to laptop computer 10B to suppress the notification at laptop computer 10B at block 112.

In another example, the external electronic device is a laptop computer that is communicatively coupled with the head-mounted device. Head-mounted device 10A may obtain sensor data at block 102 and determine at block 104 whether the laptop computer 10B is actively being viewed. In response to determining that the laptop computer 10B is actively being viewed, head-mounted device 10A foregoes presenting the notification at block 106 and sends an instruction to laptop computer 10B to present the notification at block 108.

In one example, the external electronic device is a laptop computer that is communicatively coupled with the head-mounted device. A cellular telephone 10C is also communicatively coupled to the head-mounted device 10A and the laptop computer 10B. Head-mounted device 10A may obtain sensor data at block 102 and determine at block 104 whether the laptop computer 10B is actively being viewed. In response to determining that the laptop computer 10B is not actively being viewed, head-mounted device 10A sends an instruction to laptop computer 10B to suppress the notification at laptop computer 10B (at block 112) and sends an instruction to cellular telephone 10C to present the notification (at block 114).

The external electronic device (10B) in FIG. 6 may be a cellular telephone, watch, laptop computer, table computer, or another desired type of electronic device. The additional external electronic device (10C) in FIG. 6 may be a cellular telephone, watch, laptop computer, table computer, or another desired type of electronic device.

FIG. 6 discusses a method of operating a head-mounted device. However, it should be understood that this method may be used by any type of electronic device (e.g., a cellular telephone, laptop computer, watch, etc.).

Figure 7:
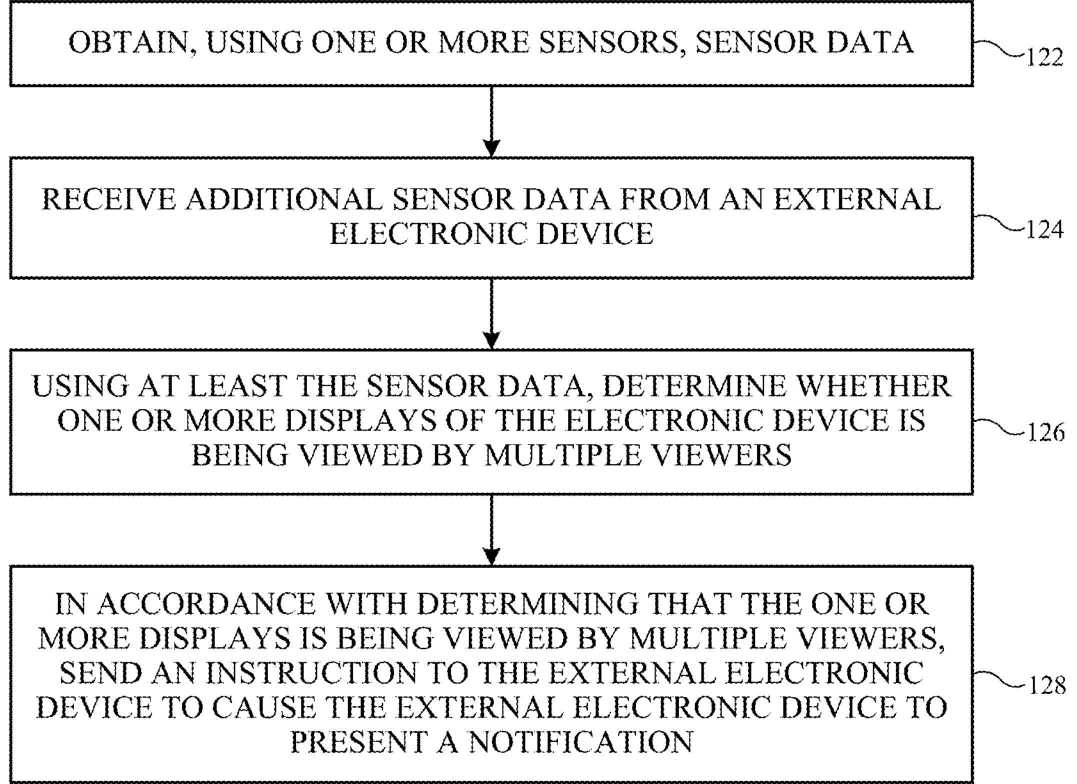
FIG. 7 is a flowchart showing an illustrative method for operating an electronic device that determines upon which device to present a notification based on whether there are multiple viewers of the electronic device in accordance with some embodiments.

FIG. 7 is a flowchart of illustrative method blocks performed by an electronic device such as electronic device 10B in FIG. 5. At block 122, electronic device 10B may obtain sensor data using one or more sensors. The one or more sensors may include camera 22B, position and motion sensor 24B, gaze tracking sensor 26B, face recognition module 30B, microphone 32B, and/or any other desired sensors.

Obtaining the sensor data in block 122 may be performed in response to receiving an incoming notification (e.g., an incoming email, text message, or phone call). In other words, one or more of the sensors that gather data at block 122 may be turned on (or may have a sampling rate increased) at block 122.

At block 124, electronic device 10B may receive additional sensor data from an external electronic device such as the communicatively coupled head-mounted device 10A. Electronic device 10B may receive the sensor data from head-mounted device 10A wirelessly (e.g., using Bluetooth communication) or using a wired connection (if available). The additional sensor data from head-mounted device 10A may include sensor data from camera 22A, position and motion sensor 24A, gaze tracking sensor 26A, microphone 32A, depth sensor 28A, and/or any other desired sensors in head-mounted device 10A.

At block 126, the head-mounted device may determine, using the sensor data from block 122 and/or the sensor data from block 124, whether an external electronic device is being viewed by multiple viewers.

Camera 22B may capture images of an area in front of electronic device 10B (e.g., at an expected viewing location of electronic device 10B). The images from camera 22B may be analyzed to detect whether one or more viewers are present in front of electronic device 10B. The images from camera 22B may be visible light images (when camera 22B is a visible light camera) or infrared images (when camera 22B is an infrared camera).

Position and motion sensors 24B may determine a position and/or pose of electronic device 10B. The determined position may be compared to known positions of nearby users (e.g., using ultra-wideband communications) to identify if multiple viewers are likely. Instead or in addition, the pose of electronic device 10B may be compared to poses associated with multiple viewers to identify if multiple viewers are likely.

Gaze tracking sensor 26B may be used to identify the eyes of one or more users in the vicinity of electronic device 10B and may be determine if the users' directions of gaze and/or points of gaze are aligned with electronic device 10B. If multiple viewers are detected with respective points of gaze aligned with electronic device 10B, it is an indicator that electronic device 10B is being viewed by multiple users.

Microphone 32B may capture audio data and analyze the audio data to determine if there are two or more speakers in the vicinity of electronic device 10B. If two or more speakers are detected, it is an indicator that electronic device 10B is being viewed by multiple users.

Face recognition module 30B may capture images (e.g., infrared images using an infrared camera) at an expected viewing location of electronic device 10B. The images from face recognition module 30B may be analyzed to detect whether one or more viewers are present in front of electronic device 10B.

Any or all of these factors may be used by control circuitry 14B to determine whether electronic device 10B is being viewed by multiple viewers at block 126.

At block 128, in response to determining that display 18B is being viewed by multiple viewers, electronic device 10B may send an instruction to head-mounted device 10A to cause the external electronic device 10A to present a notification. In other words, in order to ensure that a notification is only visible to the user of electronic devices 10A and 10B, the notification may be presented on electronic device 10B when only the user is viewing the electronic device and the notification may be presented on head-mounted device 10A when electronic device 10B has multiple viewers.

Consider an example where electronic device 10B is a laptop computer. The laptop computer may obtain sensor data at block 122. The laptop computer may wirelessly receive additional sensor data from head-mounted device 10A at block 124. At block 126, the laptop computer may use the sensor data obtained by the laptop computer and/or the sensor data wirelessly received from head-mounted device 10A (and captured by sensors in head-mounted device 10A) to determine whether display 18B in laptop computer 10B is being viewed by multiple viewers. At block 128, in accordance with determining that display 18B is being viewed by multiple viewers, laptop computer 10B sends an instruction to head-mounted device 10A to cause head-mounted device 10A to present a notification. If alternatively, it is determined that display 18B is being viewed by only one viewer, laptop computer 10B may instead present the notification on display 18B.

The electronic device (10B) in FIG. 7 may be a cellular telephone, watch, laptop computer, table computer, or another desired type of electronic device. The external electronic device (10A) in FIG. 7 may be a head-mounted device, cellular telephone, watch, laptop computer, table computer, or another desired type of electronic device.

The order of blocks in FIGS. 6 and 7 is merely illustrative and the blocks may be performed in different orders if desired. Moreover, one or more blocks may be omitted from FIGS. 6 and 7 if desired.

Additionally, the blocks of FIGS. 6 and 7 may be performed in the same system if desired. For example, head-mounted device 10A may determine that electronic device 10B is actively being viewed and send an instruction electronic device 10B to present a notification (e.g., using the blocks of FIG. 6). Electronic device 10B may then determine that there are multiple viewers for display 18B in electronic device 10B and send an instruction to head-mounted device 10A to present the notification (e.g., using the blocks of FIG. 7).

In the examples herein, a notification is the primary example of content that is presented to the user based on the user's attention. However, these techniques may be applied to any desired output (e.g., a voice response to a user question for a digital assistant).

As described above, one aspect of the present technology is the gathering and use of information such as sensor information. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to have control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

The foregoing is merely illustrative and various modifications can be made to the described embodiments. The foregoing embodiments may be implemented individually or in any combination.

What is claimed is:

1. A head-mounted device comprising:

one or more sensors;

one or more output devices;

one or more processors; and memory storing instructions configured to be executed by the one or more processors, the instructions for:

obtaining, using the one or more sensors, sensor data;

using the sensor data, determining whether an external electronic device is being actively viewed;

in accordance with determining that the external electronic device is not being actively viewed:

presenting a notification using the one or more output devices;

sending an instruction to the external electronic device to cause the external electronic device to suppress the notification; and sending an additional instruction to an additional external electronic device to cause the additional external electronic device to present the notification regardless of whether the additional external electronic device is being actively viewed.

2. The head-mounted device defined in claim 1, wherein the instructions further comprise instructions for:

in accordance with determining that the external electronic device is being actively viewed, foregoing presenting the notification using the one or more output devices.

3. The head-mounted device defined in claim 1, further comprising: communication circuitry that is configured to wirelessly communicate with the external electronic device, wherein sending the instruction to the external electronic device comprises sending the instruction to the external electronic device using the communication circuitry and wherein the instructions further comprise instructions for:

in accordance with determining that the external electronic device is being actively viewed, sending, using the communication circuitry, an instruction to the external electronic device to cause the external electronic device to present the notification.

4. The head-mounted device defined in claim 1, wherein the one or more sensors comprise one or more gaze detection sensors configured to determine a point of gaze, an accelerometer configured to determine a head position, or a camera.

5. The head-mounted device defined in claim 1, wherein the one or more output devices comprises one or more displays and wherein presenting the notification using the one or more output devices comprises displaying the notification using the one or more displays.

6. The head-mounted device defined in claim 1, wherein the one or more output devices comprises one or more speakers and wherein presenting the notification using the one or more output devices comprises playing audio using the one or more speakers.

7. The head-mounted device defined in claim 1, wherein the notification comprises a notification of an incoming text message, a notification of an incoming phone call, or a notification of an incoming email.

8. The head-mounted device defined in claim 1, wherein the external electronic device comprises a cellular telephone, a watch, or a laptop computer.

9. A method of operating a head-mounted device that comprises one or more sensors and one or more output devices, the method comprising:

obtaining, using the one or more sensors, sensor data;

using the sensor data, determining whether an external electronic device is being actively viewed;

in accordance with determining that the external electronic device is not being actively viewed:

presenting a notification using the one or more output devices;

sending an instruction to the external electronic device to cause the external electronic device to suppress the notification; and sending an additional instruction to an additional external electronic device to cause the additional external electronic device to present the notification regardless of whether the additional external electronic device is being actively viewed.

10. The method defined in claim 9, further comprising:

in accordance with determining that the external electronic device is being actively viewed, foregoing presenting the notification using the one or more output devices.

11. The method defined in claim 9, wherein the head-mounted device further comprises communication circuitry that is configured to wirelessly communicate with the external electronic device, wherein sending the instruction to the external electronic device comprises sending the instruction to the external electronic device using the communication circuitry, and wherein the method further comprises:

in accordance with determining that the external electronic device is being actively viewed, sending, using the communication circuitry, an instruction to the external electronic device to cause the external electronic device to present the notification.

12. The method defined in claim 9, wherein the one or more sensors comprise one or more gaze detection sensors configured to determine a point of gaze, an accelerometer configured to determine a head position, or a camera.

13. The method defined in claim 9, wherein the one or more output devices comprises one or more displays and wherein presenting the notification using the one or more output devices comprises displaying the notification using the one or more displays.

14. The method defined in claim 9, wherein the one or more output devices comprises one or more speakers and wherein presenting the notification using the one or more output devices comprises playing audio using the one or more speakers.

15. The method defined in claim 9, wherein the notification comprises a notification of an incoming text message, a notification of an incoming phone call, or a notification of an incoming email.

16. The method defined in claim 9, wherein the external electronic device comprises a cellular telephone, a watch, or a laptop computer.

17. A non-transitory computer-readable storage medium storing one or more programs configured to be executed by one or more processors of a head-mounted device that comprises one or more sensors and one or more output devices, the one or more programs including instructions for:

obtaining, using the one or more sensors, sensor data;

using the sensor data, determining whether an external electronic device is being actively viewed;

in accordance with determining that the external electronic device is not being actively viewed:

presenting a notification using the one or more output devices;

sending an instruction to the external electronic device to cause the external electronic device to suppress the notification; and sending an additional instruction to an additional external electronic device to cause the additional external electronic device to present the notification regardless of whether the additional external electronic device is being actively viewed.

18. The non-transitory computer-readable storage medium defined in claim 17, wherein the instructions further comprise instructions for:

in accordance with determining that the external electronic device is being actively viewed, foregoing presenting the notification using the one or more output devices.

19. The non-transitory computer-readable storage medium defined in claim 17, wherein the head-mounted device further comprises communication circuitry that is configured to wirelessly communicate with the external electronic device, wherein sending the instruction to the external electronic device comprises sending the instruction to the external electronic device using the communication circuitry, and wherein the instructions further comprise instructions for:

in accordance with determining that the external electronic device is being actively viewed, sending, using the communication circuitry, an instruction to the external electronic device to cause the external electronic device to present the notification.

20. The non-transitory computer-readable storage medium defined in claim 17, wherein the one or more sensors comprise one or more gaze detection sensors configured to determine a point of gaze, an accelerometer configured to determine a head position, or a camera.

21. The non-transitory computer-readable storage medium defined in claim 17, wherein the one or more output devices comprises one or more displays and wherein presenting the notification using the one or more output devices comprises displaying the notification using the one or more displays.

22. The non-transitory computer-readable storage medium defined in claim 17, wherein the one or more output devices comprises one or more speakers, wherein presenting the notification using the one or more output devices comprises playing audio using the one or more speakers, and wherein the notification comprises a notification of an incoming text message, a notification of an incoming phone call, or a notification of an incoming email and wherein the external electronic device comprises a cellular telephone, a watch, or a laptop computer.

23. The head-mounted device defined in claim 1, wherein the external electronic device has a larger display than the additional external electronic device.

24. The head-mounted device defined in claim 1, wherein the additional external electronic device is lower on a hierarchy of target devices for presenting notifications than the external electronic device.

* * * * *